US006226878B1

(12) United States Patent
Shannon

(10) Patent No.: US 6,226,878 B1
(45) Date of Patent: May 8, 2001

(54) METHOD AND APPARATUS FOR FORMING DECORATIVE PATTERNS IN FLOOR COVERINGS

(76) Inventor: Steve Shannon, 359 Linden Ct., Herndon, VA (US) 20170

(*) Notice: Subject to any disclaimer, the term of this patent is extended or adjusted under 35 U.S.C. 154(b) by 0 days.

(21) Appl. No.: 09/296,603

(22) Filed: Apr. 23, 1999

(51) Int. Cl.[7] .............................. B23Q 35/04; B43L 9/00

(52) U.S. Cl. ............................ 33/26; 33/27.12; 33/27.01; 33/561.2

(58) Field of Search ......................... 33/26, 27.01, 27.12, 33/41.1, 41.5, 42, 526, 527, 561.1, 561.2, 562, 563, 564, 565

(56) References Cited

U.S. PATENT DOCUMENTS

| | | | | |
|---|---|---|---|---|
| 1,907,738 | * | 5/1933 | Christman | 33/41.1 |
| 2,217,998 | * | 10/1940 | Buttress | 33/561.2 |
| 2,243,778 | | 5/1941 | Stansel | 33/41.6 |
| 2,296,232 | | 9/1942 | Drain | 33/41.1 |
| 2,490,119 | * | 12/1949 | Edinger | 33/26 |
| 2,600,728 | * | 6/1952 | Bernard | 33/27.12 |
| 2,790,245 | * | 4/1957 | Wilkes | 33/561.2 |
| 3,266,160 | * | 8/1966 | Toien | 33/562 |
| 3,768,347 | * | 10/1973 | Wade et al. | 33/27.12 |
| 4,194,543 | * | 3/1980 | Cotton | 33/26 |
| 4,502,232 | * | 3/1985 | Broders | 33/562 |
| 4,539,757 | * | 9/1985 | Shyu | 33/561.2 |
| 5,188,013 | | 2/1993 | Cardinale | 33/527 |
| 6,044,570 | * | 4/2000 | Nochowitz | 33/526 |

* cited by examiner

*Primary Examiner*—G. Bradley Bennett
(74) *Attorney, Agent, or Firm*—Merek & Voorhees

(57) ABSTRACT

A method and apparatus for forming decorative patterns in floor coverings. The preferred form of the apparatus includes a marking device having a body member. The body member includes a channel for receiving a guide member. The apparatus further includes a guide member to guide movement of the marking device along a predetermined path. The guide member is flexible so that it can be positioned on floor coverings in various configurations. The marking device includes a marking implement to mark floor coverings as the marking device is moved along the guide member. The preferred method is performed on site, i.e. at the site of the installation. Further, the preferred method is such that it can be performed relatively expeditiously and with great precision. Moreover, the preferred method can be performed with great accuracy without the need for a highly trained artisan.

20 Claims, 7 Drawing Sheets

METHOD AND APPARATUS FOR FORMING DECORATIVE PATTERNS IN FLOOR COVERINGS

FIELD OF THE INVENTION

The present invention generally relates to the field of floor coverings including but not limited to carpet, vinyl tile and linoleum floor coverings. More particularly, the present invention is directed to a method and apparatus for forming predetermined patterns in floor coverings.

BACKGROUND OF THE INVENTION

It has become desirable in the field of floor coverings and in particular in office buildings and hospitals for interior designers and architects to design floors which are compatible with the design theme of the furniture, floor plan and wall covering layout selected by the designer. In order to create an appropriate floor design, it has become necessary to use different colors and/or patterns of floor covering material (e.g. carpet, vinyl tile or linoleum floor covering material). This is accomplished by cutting out desired shapes of one color and/or pattern of floor covering material and inserting corresponding shapes of another color and/or pattern of floor covering material. Before now, this process was accomplished in one of two manners. The first was to use expensive machinery connected to an autocad system to cut precise shapes of a first floor covering material and bond in new shapes of a second floor covering material. This machinery is located off-site, i.e. at a site other than the site of installation. Hence, there is significant delays and additional expense in shipping the desired floor covering materials to the off-site location to have the floor covering materials cut to the specifications of the designer or architect. Obviously, this process is disadvantageous because of its expense and the fact that it prolongs the time necessary to complete the installation. The second manner is to attempt to cut the material out by hand. This is extremely difficult and time consuming. Further, this process generally creates a sloppy looking finished product even when performed by a highly skilled artisan. A template may be used in this process. However, the template is pre-configured and, therefore, can only cut one specific pattern. Hence, there exists a significant need for a method and apparatus for forming decorative patterns in floor coverings which overcome the substantial and numerous inherent disadvantages of the prior art.

OBJECTS AND SUMMARY OF THE INVENTION

An object of a preferred form of the present invention is to provide novel and unobvious method and apparatus for forming decorative patterns in floor coverings.

Another object of a preferred form of the present invention is to provide a method for forming decorative patterns in floor coverings which can be performed relatively expeditiously and with great precision.

A further object of a preferred form of the present invention is to provide an apparatus for forming decorative patterns in floor coverings which can be operated relatively expeditiously and with great precision.

Still a further object of a preferred form of the present invention is to provide a method of forming decorative patterns in floor coverings that can be performed on site, i.e. at the site of installation.

Yet still a further object of a preferred form of the present invention is to provide an apparatus for forming decorative patterns in floor coverings that can be used on site, i.e. at the site of installation.

Yet another object of a preferred form of the present invention is to provide a method for forming decorative patterns in floor coverings which can be performed in considerably less time and at less expense than previously known methods.

Yet still another object of the present invention is to provide an apparatus for forming decorative patterns in floor coverings which performs with the precision of off-site machinery at a fraction of the cost.

These and other objects of the present invention will be readily apparent upon review of the following detailed description of the invention and the accompanying drawings. These objects of the present invention are not exhaustive and are not to be construed as limiting the scope of the claimed invention.

In summary, a preferred form of the present invention is directed to a method and apparatus for forming decorative patterns in floor coverings. The preferred form of the apparatus includes a marking device having a body member. The body member includes a channel for receiving a guide member. The apparatus further includes a guide member to guide movement of the marking device along a predetermined path. The guide member is flexible so that it can be positioned on floor coverings in various configurations. The marking device includes a marking implement to mark floor coverings as the marking device is moved along the guide member. The preferred method is performed on site, i.e. at the site of the installation. Further, the preferred method is such that it can be performed relatively expeditiously and with great precision. Moreover, the method can be performed with great accuracy without the need for a highly trained artisan. The foregoing summary describes a preferred form and is not in any way to be construed as limiting the claimed invention to the preferred form.

DETAILED DESCRIPTION OF THE INVENTION

The preferred apparatus of the present invention will now be described with reference made to FIGS. 1 to 3.

FIGS. 1 THROUGH 3

Figure 1:
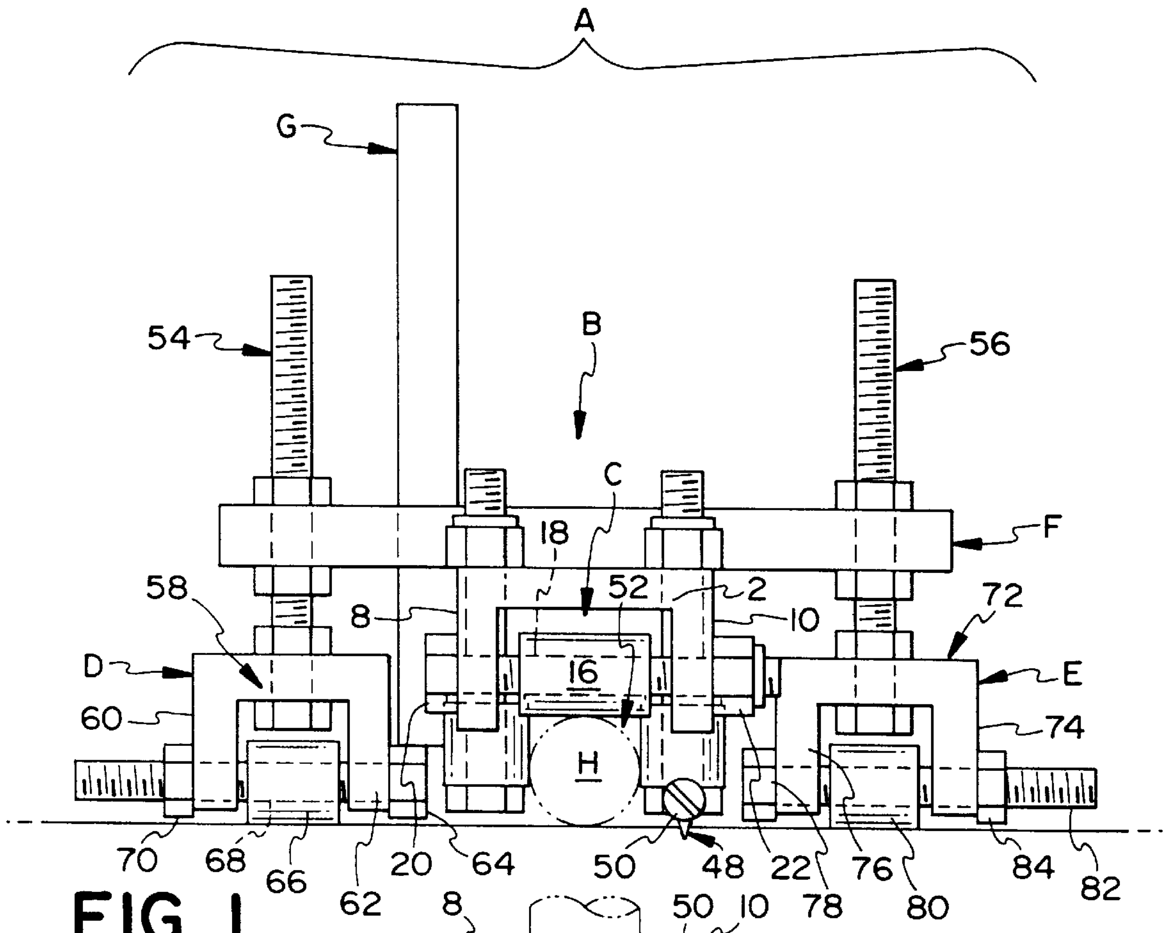
FIG. 1 is a front elevational view of a preferred embodiment of the present invention.

Referring to FIG. 1, a marking device A includes a body B having a central roller carriage C, a left roller carriage D, a right roller carriage E, a support arm F and a handle G. The handle G is provided to permit an individual to readily push or pull the marking device A along the floor covering. It will be readily appreciated that the handle G could be provided with a conventional handle grip or could be omitted entirely. Further, the handle could be replaced with a support arm for attaching various auxiliary elements, for example, a router. The central roller carriage C includes a support plate 2 having left and right side walls 4 and 6, as best seen in FIG. 2. Support legs 8, 10, 12 and 14 extend downwardly from the four corners of the support plate 2, as seen in FIGS. 1 to 3. Support legs 8 and 10 are positioned opposite from each other and support roller guide 16 on shaft 18 of bolt 20. Roller guide 16 is free to rotate relative to shaft 18 of bolt 20. Bolt 20 passes through openings formed in support legs 8 and 10 and is secured thereto via nut 22. Support legs 12 and 14 are positioned opposite from each other and support roller guide 24 on shaft 26 of bolt 28, as seen in FIG. 2. Roller guide 24 is free to rotate relative to shaft 26 of bolt 28. Bolt 28 passes through openings formed in support legs 12 and 14 and handle G and is secured to these elements via nut 30. It should be noted that the roller guides 16 and 24 may be suspended from the corresponding support legs in various different manners.

Guide rollers 32, 34, 36 and 38 are suspended from support plate 2 via bolts 40, 42, 44 and 46, respectively. The rollers 32, 34, 36 and 38 are all free to rotate on the shafts of the corresponding bolts. The bolts 40, 42, 44 and 46 are secured to the support plate 2 via conventional nuts. The roller guides 32, 34, 36 and 38 extend substantially parallel to each other and substantially perpendicular to roller guides 16 and 24. Roller guides 32, 34, 36 and 38 may be suspended from support plate 2 in various different ways.

Figure 2:
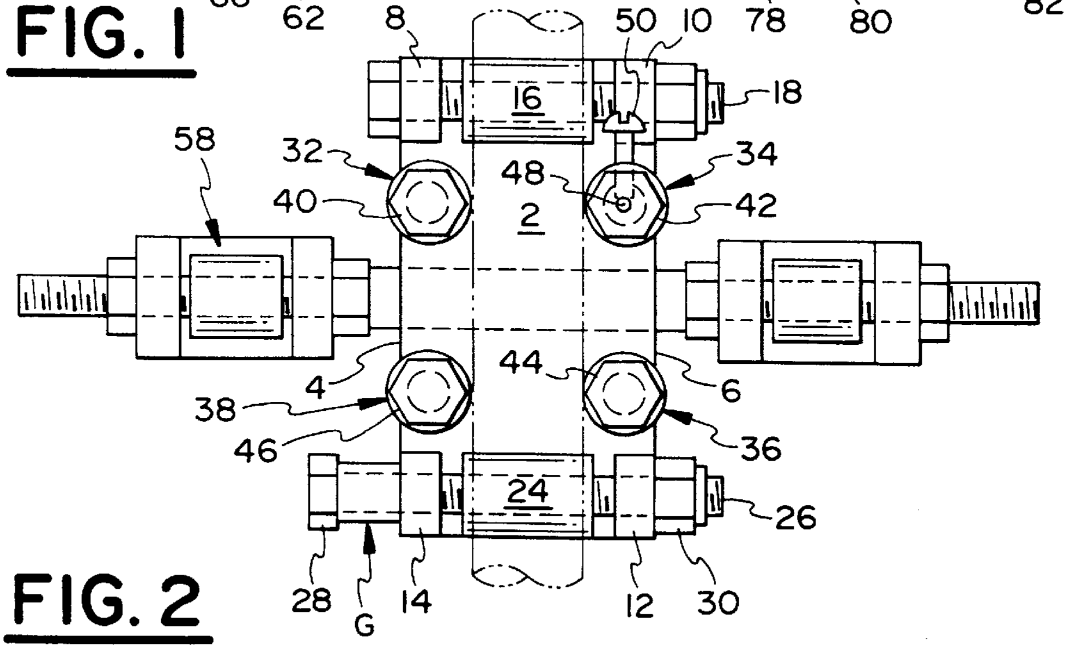
FIG. 2 is bottom view of the preferred embodiment of the present invention depicted in FIG. 1.
Figure 3:
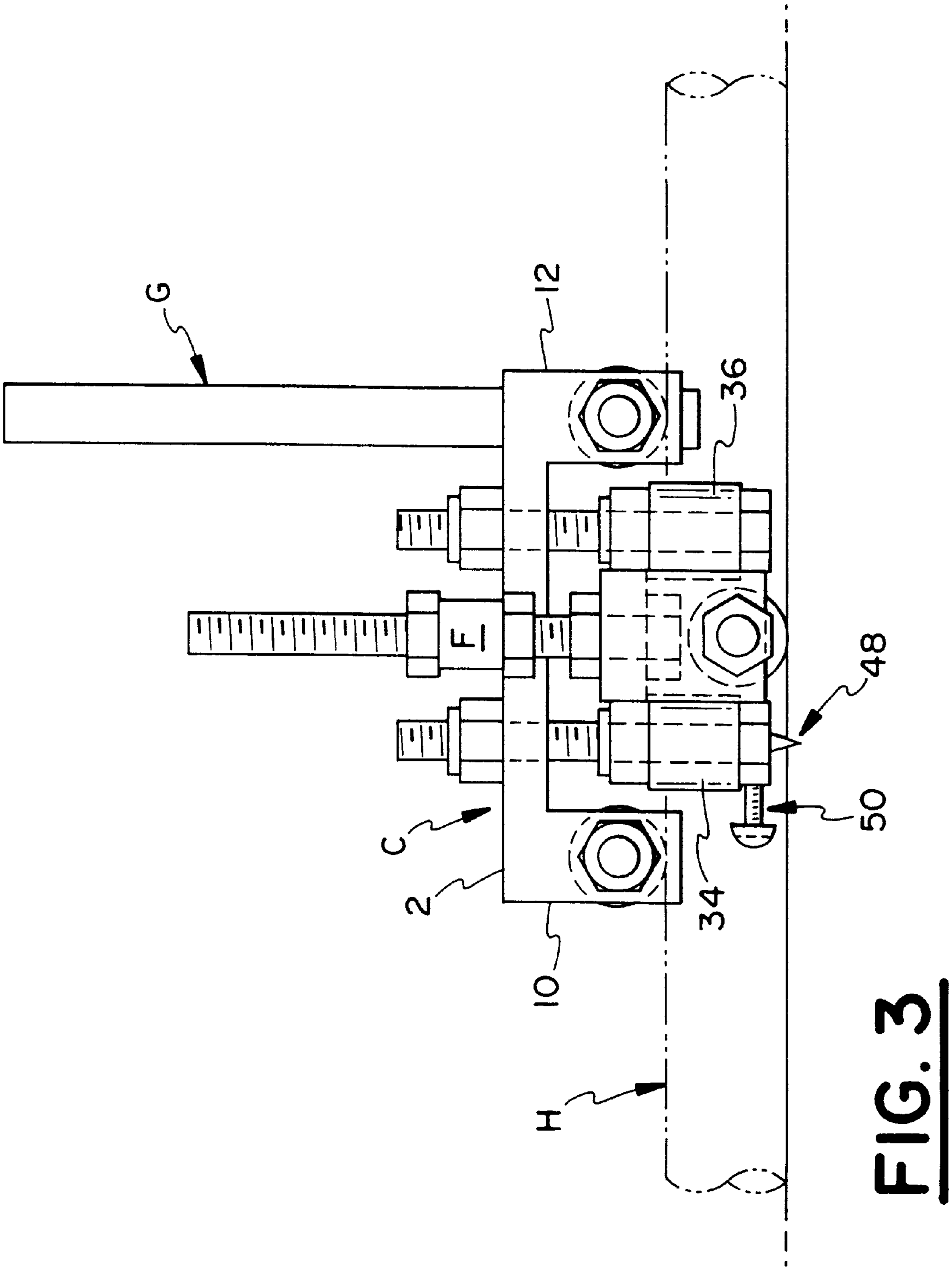
FIG. 3 is a side elevational view of the preferred embodiment of the present invention depicted FIG. 1.

Referring to FIG. 2, a bore is formed in the head of bolt 42 for receiving a marking implement 48. A screw 50 holds the marking implement 48 in the desired position and permits adjustment as well as replacement thereof. The marking implement 48 can either be a scoring tool or a cutting tool. As used herein a cutting tool is a tool that cuts substantially completely through the thickness of the floor covering. More specifically, after a cutting tool has cut a closed section (e.g. a circular inner section) of floor covering, this closed section can be removed from the remaining section of floor without additional cutting. As used herein a scoring tool is any implement which marks but does not cut through substantially completely the thickness of the floor covering. Examples of scoring tools are: (1) a tool which forms a mark on the top surface of a floor covering via a pencil or other writing implement; (2) a tool which forms a depression such as a valley or groove in the top surface of a floor covering; (3) or a tool which forms a scratch in the top surface of a floor covering.

Central carriage C has a channel 52 for receiving a guide member H. Preferably, the guide member H is a flexible hosing which can be readily placed on floor coverings in linear and non-linear configurations. However, it will be readily appreciated that the guide member could be a rigid member pre-shaped to the desired configuration. Roller guides 16 and 24 engage the top of the guide member H while roller guides 32, 34, 36 and 38 engage the sides thereof. In this manner, the marking device A can be readily advanced along the guide member H to mark the floor covering in the desired manner.

Support arm F is secured to the support plate 2 and extends outwardly from the left side wall 4 and the right side wall 6. The support arm F could be secured to the support plate 2 in various different manners including but not limited to by welding or by conventional fasteners. Additionally, the support arm F could be formed as one-piece with the support plate 2. Left carriage D and right carriage E are suspended from support arm F via bolts 54 and 56, respectively and are secured thereto with conventional nuts. Left carriage D includes a support plate 58 and support legs 60 and 62 extending downwardly therefrom. A bolt 64 passes through openings in support legs 60 and 62 to support advancement roller 66 on shaft 68. Bolt 64 is secured to the support legs via a nut 70. Advancement roller 66 is free to rotate on shaft 68. Right roller carriage E includes a support plate 72 and support legs 74 and 76 extending downwardly therefrom. A bolt 78 passes through openings in support legs 74 and 76 to support advancement roller 80 on shaft 82. Bolt 78 is secured to the support legs via a nut 84. Advancement roller 80 is free to rotate on shaft 82.

FIG. 3A

Figure 3A:
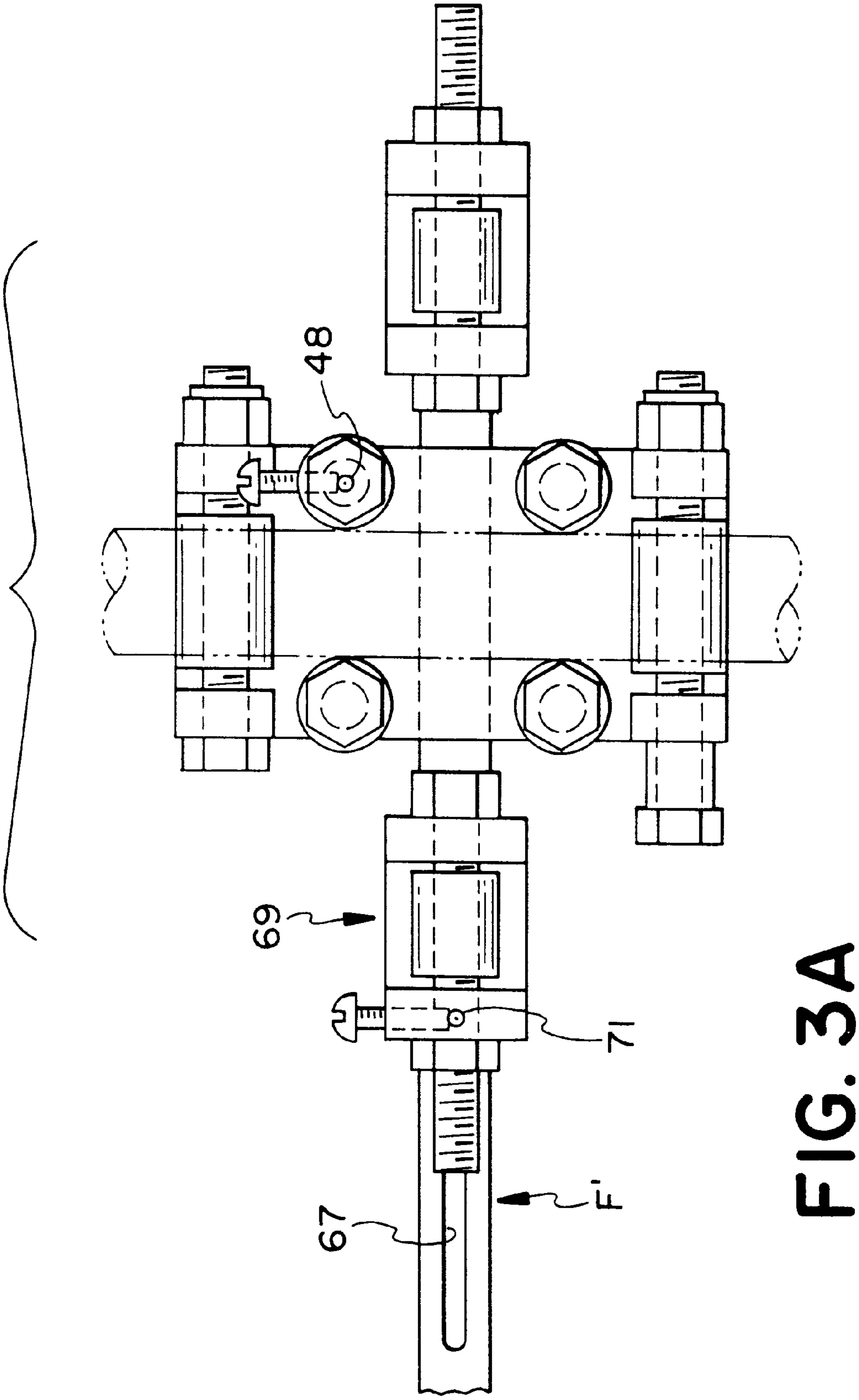
FIG. 3A is a bottom view of an alternative embodiment of the present invention.

Referring to FIG. 3A, an alternative marking device 65 is depicted. The marking device 65 is exactly the same as the marking device A with the exceptions that the support arm F' is extended and provided with a slot 67 so that the position of left roller carriage 69 is adjustable. The left roller carriage 69 is provide with a marking implement 71 similar to marking implement 48. In this manner, a strip of floor covering having a width equal to the distance between the marking implement 48 and the marking implement 71 can be readily marked and cut for removal. Further, the width of this strip can be readily adjusted by adjusting the position of the left roller carriage 69.

FIG. 4

Figure 4:
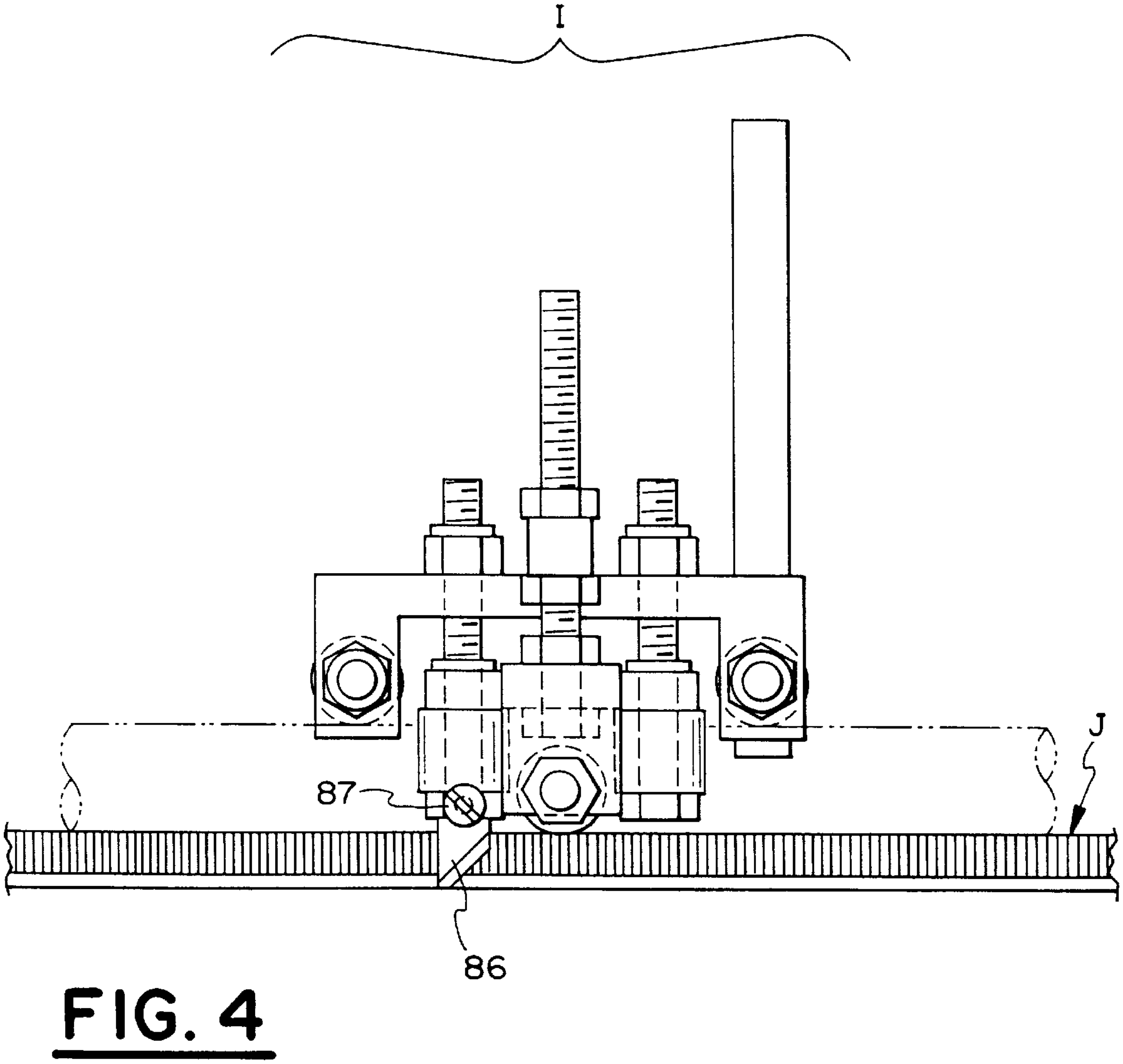
FIG. 4 is a side elevational view of a second alternative embodiment of the present invention.

Referring to FIG. 4, a further alternative marking device I is depicted. The marking device I is exactly the same as the marking device A with the sole exception that the marking tool 86 is a cutting tool that cuts substantially completely through the floor covering J.
Screw 87 holds the cutting tool 86 in the desired position and permits adjustment as well as replacement thereof.

PREFERRED METHOD OF OPERATION

Figure 6:
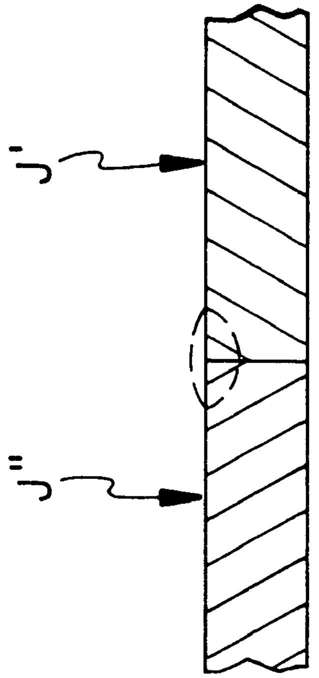
FIG. 6 is a fragmentary sectional view of two adjacent pieces of floor coverings being welded together.
Figure 5:
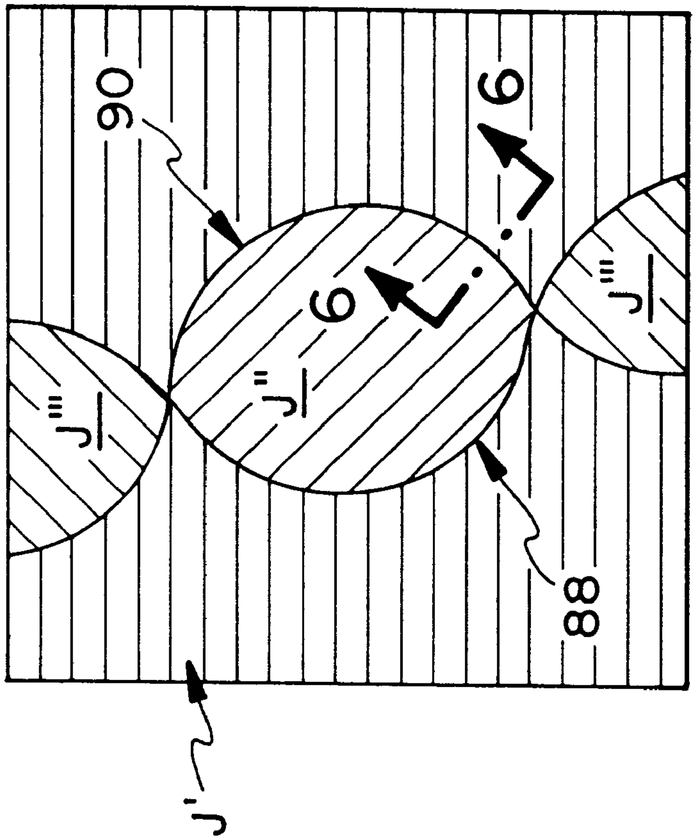
FIG. 5 is a plan view of a finished floor covering installed in accordance with the preferred method of the present invention.

The preferred method of operation will now be described with reference to FIGS. 1 through 8. Referring to FIG. 5, the guide member H is positioned on top of floor covering J' in a serpentine fashion to form curve 88. Using the handle G, the marking device A is then positioned on the guide member H and advanced the length thereof to mark the floor covering J' in a configuration corresponding to curve 88. Subsequently, the guide member H is positioned in a serpentine fashion to form curve 90. The marking device A is then positioned on the guide member H and advanced along the floor covering J' to form a mark corresponding to the curve 90. Since the marking tool of the marking device A does not cut completely through the floor covering J', an individual takes a conventional tool for cutting floor coverings and cuts along the marks formed by the marking device A. The cut sections are then removed and replaced with the desired different floor coverings J" and J'". The floor coverings may differ in various manners including but not limited to color or pattern. Preferably, a Leister welder model no. CH-6056 is used to heat weld adjacent floor coverings in a conventional manner, as depicted in FIG. 6.

This heat welding process forms a decorative border between adjacent sections of floor coverings. Welding rods of different colors can be used to form a pin stripe appearance.

Figure 7:
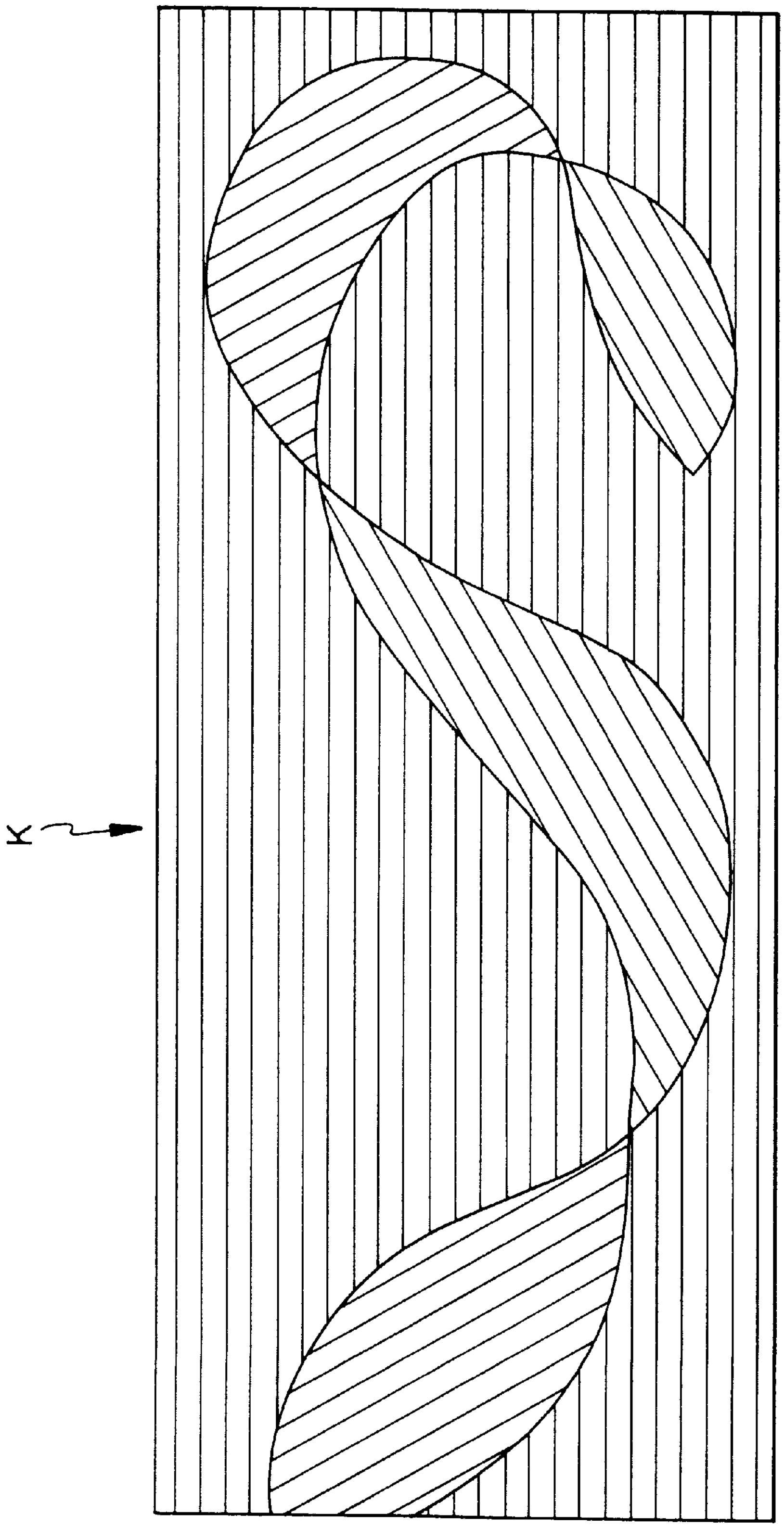
FIG. 7 is a plan view of an alternative form of a finished floor covering installed in accordance with th preferred method of the present invention.
Figure 8:
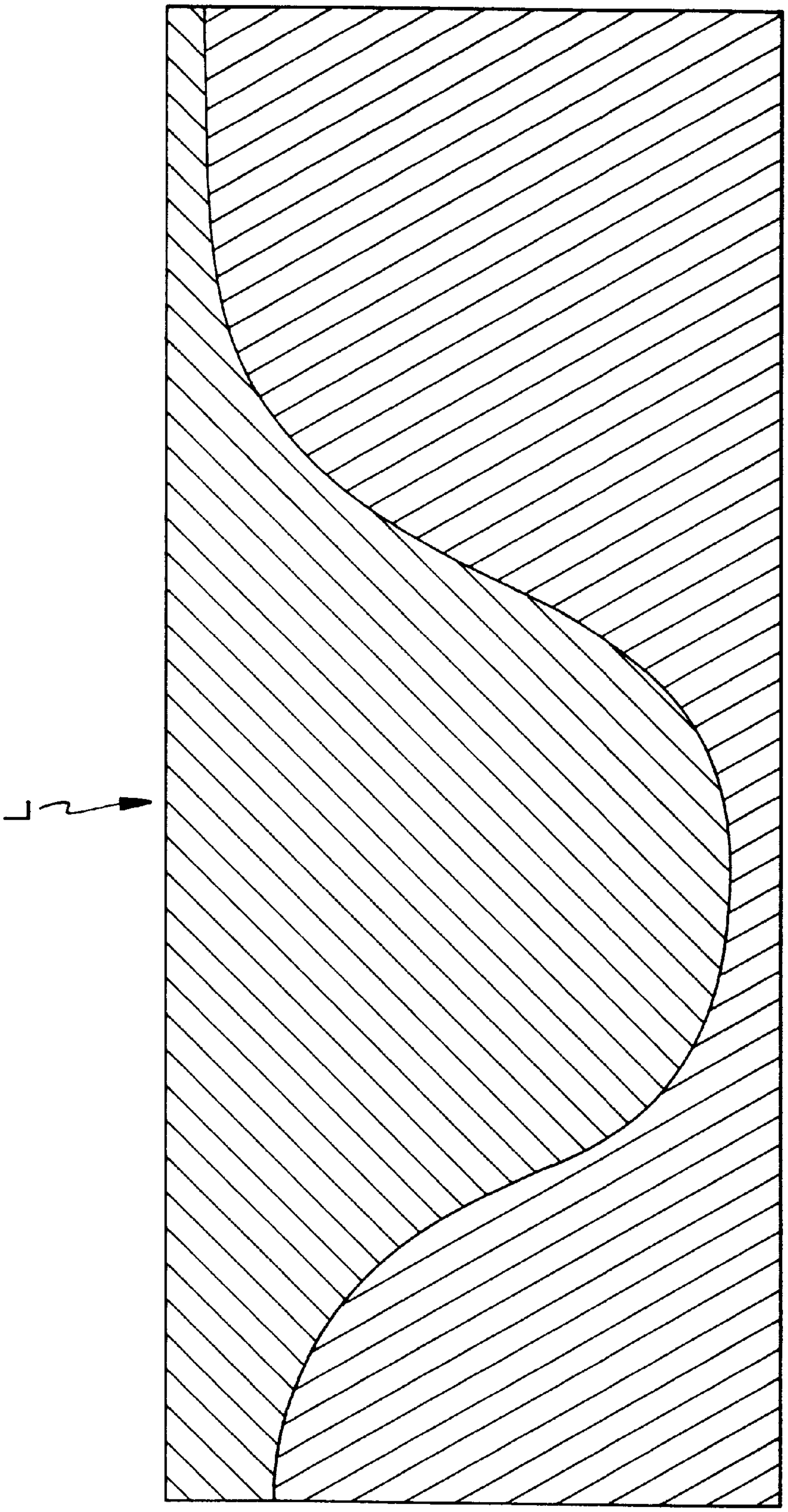
FIG. 8 is a plan view of a further alternative form of a finished floor covering installed in accordance with the preferred method of the present invention.

It should be noted that when a cutting tool is used, it is not necessary to have an individual go over the markings with a conventional cutting tool. It should also be noted that a rigid preformed guide member in connection with the marking device may be used to form the desired markings on the floor covering. FIGS. 7 and 8 depict finished floor coverings K and L, respectively with two of numerous different possible designs. Another possible design could be a half hitch formation in the center of the flooring with one strand of the half hitch a first color and the second strand a second color. The surrounding flooring of the first strand would be the second color while the surrounding flooring of the second strand would be the first color.

ALTERNATIVE METHOD OF OPERATION

As opposed to placing the guide member H directly on a floor covering, it could alternatively be placed on an intermediate element, for example, paper. In this alternative process, the marking implement of the marking device A would preferably be a perforation wheel. As the marking device is moved along the guide member H, perforations are formed in the paper or other intermediate element. The perforated paper is then placed on the object to be marked, for example the back of very thick carpeting which can not be cut with ease. Then powdered marking chalk is sprinkled on the paper so that the back of the carpeting is marked with the powdered marking chalk along the perforations of the paper. Subsequently, the carpet is cut along the marks formed by the marking chalk on the back of the paper to cut the carpet in the desired pattern.

While this invention has been described as having a preferred design, it is understood that it is capable of further modifications, uses and/or adaptions of the invention following in general the principle of the invention and including such departures from the present disclosure as come within the known or customary practice in the art to which the present invention pertains and as maybe applied to the central features hereinbefore set forth, and fall within the scope of the invention and the limits of the appended claims.

I claim:

1. An apparatus for forming decorative patterns in floor coverings, comprising:

(a) a marking device having a body member, said body member having a channel for receiving a guide member:

(b) a guide member to guide movement of said marking device along a predetermined path, said guide member being flexible so that it can be positioned on floor coverings in various configurations;

(c) at least one guide roller being positioned adjacent said channel for contacting said guide member so that said marking device can move along said guide member; and, (d) said marking device having a marking implement to mark floor coverings as said marking device is moved along said guide member.

2. An apparatus as recited in claim 1, wherein:

(a) said marking device is a scoring tool.

3. An apparatus as recited in claim 1, wherein:

(a) said marking device is a cutting tool.

4. An apparatus as recited in claim 1, wherein:

(a) said guide member is a flexible tubing.

5. An apparatus as recited in claim 1, wherein:

(a) said channel has left and right sides; and, (b) a pair of guide rollers are positioned adjacent each of said left and right sides of said channel to contact said guide member so that said marking device can move along said guide member.

6. An apparatus as recited in claim 5, wherein:

(a) said body member further includes at least one pair of advancement rollers to move said marking device along a floor covering.

7. An apparatus for forming decorative patterns in floor coverings, comprising:

(a) a marking device;

(b) a guide member operably associated with said marking device to guide movement of said marking device along a predetermined path, said guide member being flexible so that it can be positioned on floor coverings in various configurations; and, (c) said marking device having a marking implement to mark floor coverings as said marking device is moved along said guide member.

8. An apparatus as recited in claim 7, wherein:

(a) said marking device is a scoring tool.

9. An apparatus as recited in claim 7, wherein:

(a) said marking device is a cutting tool.

10. An apparatus as recited in claim 7, wherein:

(a) said guide member is a flexible tubing.

11. An apparatus as recited in claim 7, wherein:

(a) said marking device includes a guide channel having left and right sides; and, (b) a pair of guide rollers are positioned adjacent each of said left and right sides of said channel to contact said guide member so that said marking device can move along said guide member.

12. An apparatus as recited in claim 11, wherein:

(a) said body member further includes at least one pair of advancement rollers to move said marking device along a floor covering.

13. A method for forming decorative patterns in floor coverings; comprising the steps of:

(a) providing a marking device having a marking implement to mark floor coverings;

(b) providing a guide member to guide movement of the marking device along a predetermined path, the guide member can be readily shaped in at least two different configurations;

(c) positioning the guide member in one at least one of a curved configuration and a polygonal configuration on the floor covering to be marked; and, (d) moving the marking device along the guide member to form a non-linear mark on the floor covering to be marked.

14. The method recited in claim 13, including the further step of:

(a) positioning the guide member in a curved configuration on the floor covering to be marked;

(b) moving the marking device along the guide member to mark the floor covering in the curved configuration;

(c) removing a portion of the floor covering; and, (d) replacing the removed portion of floor covering with a corresponding shape of a different flooring covering.

15. The method recited in claim 13, including the further step of:

(a) positioning the guide member in a polygonal configuration on the floor covering to be marked;

(b) moving the marking device along the guide member to mark the floor covering in the polygonal configuration;

(c) removing the polygonal configuration of the floor covering; and, (d) replacing the removed portion of flooring covering with a corresponding shape of a different floor covering.

16. The method recited in claim 13, including the further step of:

(a) cutting one of a curved configuration and a polygonal configuration in the floor covering.

17. The method recited in claim 13, including the further step of:

(a) scoring one of a curved configuration and a polygonal configuration in the floor covering.

18. An apparatus for forming decorative patterns in floor coverings, comprising:

(a) a marking device having a body member, said body member having a guide channel for receiving a guide member, said guide channel having left and right sides; and, (b) said marking device having a marking implement to mark floor coverings, said marking implement being operably associated with said body member of said marking device.

19. An apparatus as recited in claim 18, further including:

(a) at least one roller guide positioned adjacent each of said left and right sides of said guide channel;

(b) said body member further including at least a first pair of advancement rollers to move the marking device along a floor covering; and, (c) a guide member to guide movement of said marking device along a predetermined path.

20. An apparatus as recited in claim 19, wherein:

(a) said guide member is flexible so that it can be positioned on floor coverings in various configurations.

* * * * *